(12) United States Patent
Ota

(10) Patent No.: US 11,245,851 B2
(45) Date of Patent: Feb. 8, 2022

(54) DISPLAY CONTROL APPARATUS AND METHOD FOR CONTROLLING THE SAME

(71) Applicant: CANON KABUSHIKI KAISHA, Tokyo (JP)

(72) Inventor: Tomohiro Ota, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/920,256

(22) Filed: Jul. 2, 2020

(65) Prior Publication Data

US 2021/0037188 A1    Feb. 4, 2021

(30) Foreign Application Priority Data

Jul. 31, 2019   (JP) .............................. JP2019-141222
Jul. 31, 2019   (JP) .............................. JP2019-141275

(51) Int. Cl.
*H04N 5/232*    (2006.01)
*H04N 13/183*   (2018.01)
*H04N 21/436*   (2011.01)

(52) U.S. Cl.
CPC . *H04N 5/232933* (2018.08); *H04N 5/232939* (2018.08)

(58) Field of Classification Search
CPC ....... H04N 5/232933; H04N 5/232939; H04N 5/23216; H04N 13/183; H04N 21/042; H04N 21/43635; H04N 11/042; G06F 3/162

USPC ......... 348/333.02, 333.01, 333.12, 563, 569; 345/619, 661, 902, 165, 567; 715/700, 715/273, 728, 828, 825, 250; 382/176
See application file for complete search history.

(56) References Cited

U.S. PATENT DOCUMENTS

| | | | |
|---|---|---|---|
| 10,652,453 B2* | 5/2020 | Ota ................... | H04N 5/232127 |
| 2015/0145766 A1* | 5/2015 | Ichieda ................. | G05F 3/005 |
| | | | 345/156 |
| 2016/0295120 A1* | 10/2016 | Ota ......................... | H04N 5/232 |
| 2017/0078740 A1* | 3/2017 | Iwami ................ | H04N 21/4363 |
| 2017/0223275 A1* | 8/2017 | Yanagisawa ........... | H04N 5/232 |
| 2018/0106982 A1* | 4/2018 | Uemura .................. | G02B 7/36 |

FOREIGN PATENT DOCUMENTS

| | | | | |
|---|---|---|---|---|
| JP | 2006-186717 A | | 7/2006 | |
| JP | 2006186717 A | * | 7/2006 | ............. H04N 5/225 |
| JP | 2018-132769 A | | 8/2018 | |

\* cited by examiner

*Primary Examiner* — Marly S Camargo
(74) *Attorney, Agent, or Firm* — Canon U.S.A., Inc. IP Division

(57) ABSTRACT

If an on/off setting of an on-screen display (OSD) on a liquid crystal display (LCD) panel ("LCD OSD" setting) is changed from on to off on an "LCD OSD" setting screen of a menu screen, a system control unit stores a flag A indicating that the "LCD OSD" setting is changed to off into a system memory. If a menu end operation is made and the flag A is stored, the system control unit changes the "LCD OSD" setting to off and ends the menu screen. The setting of the information display on the LCD panel can thereby be made with high operability.

22 Claims, 10 Drawing Sheets

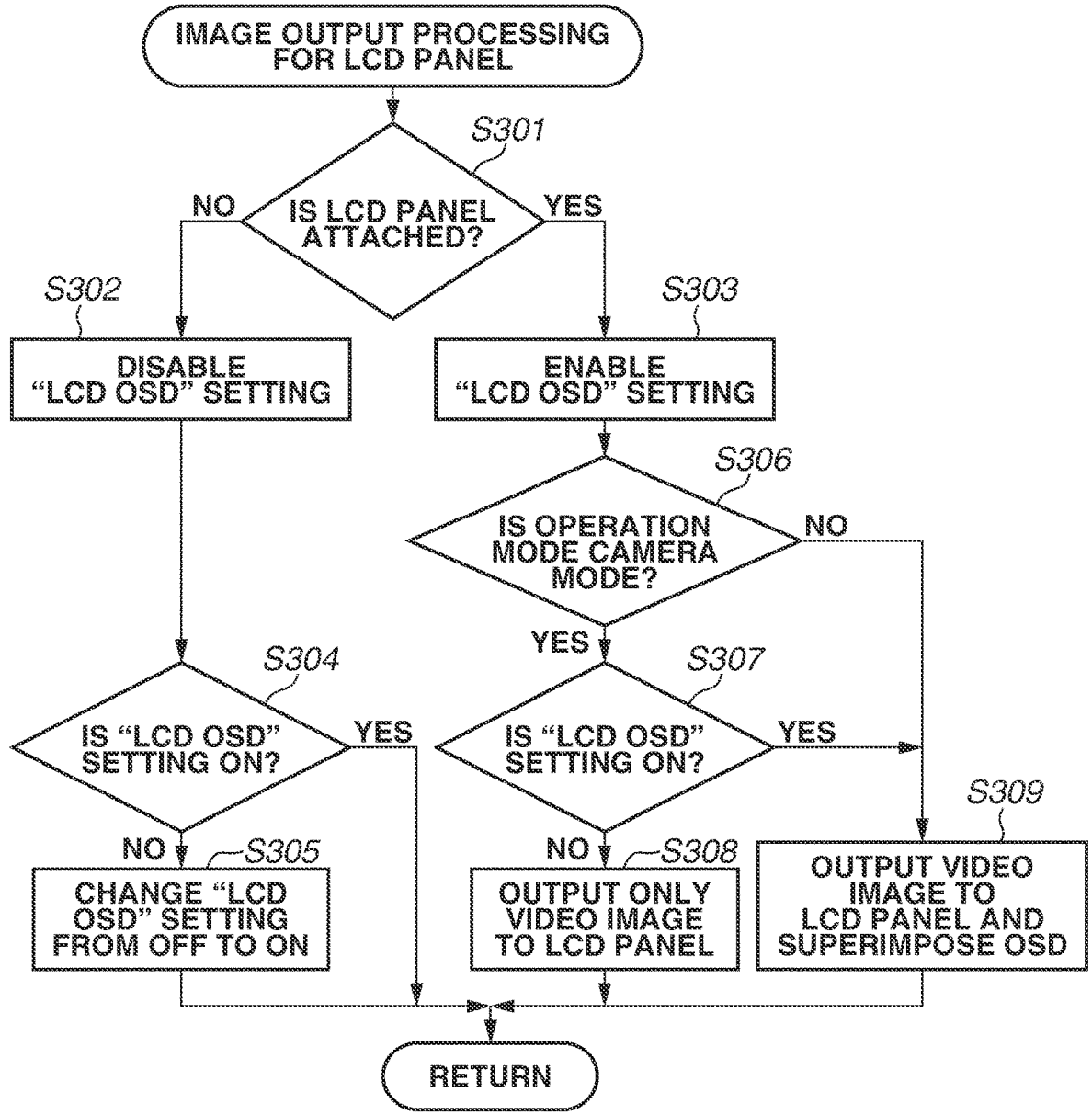

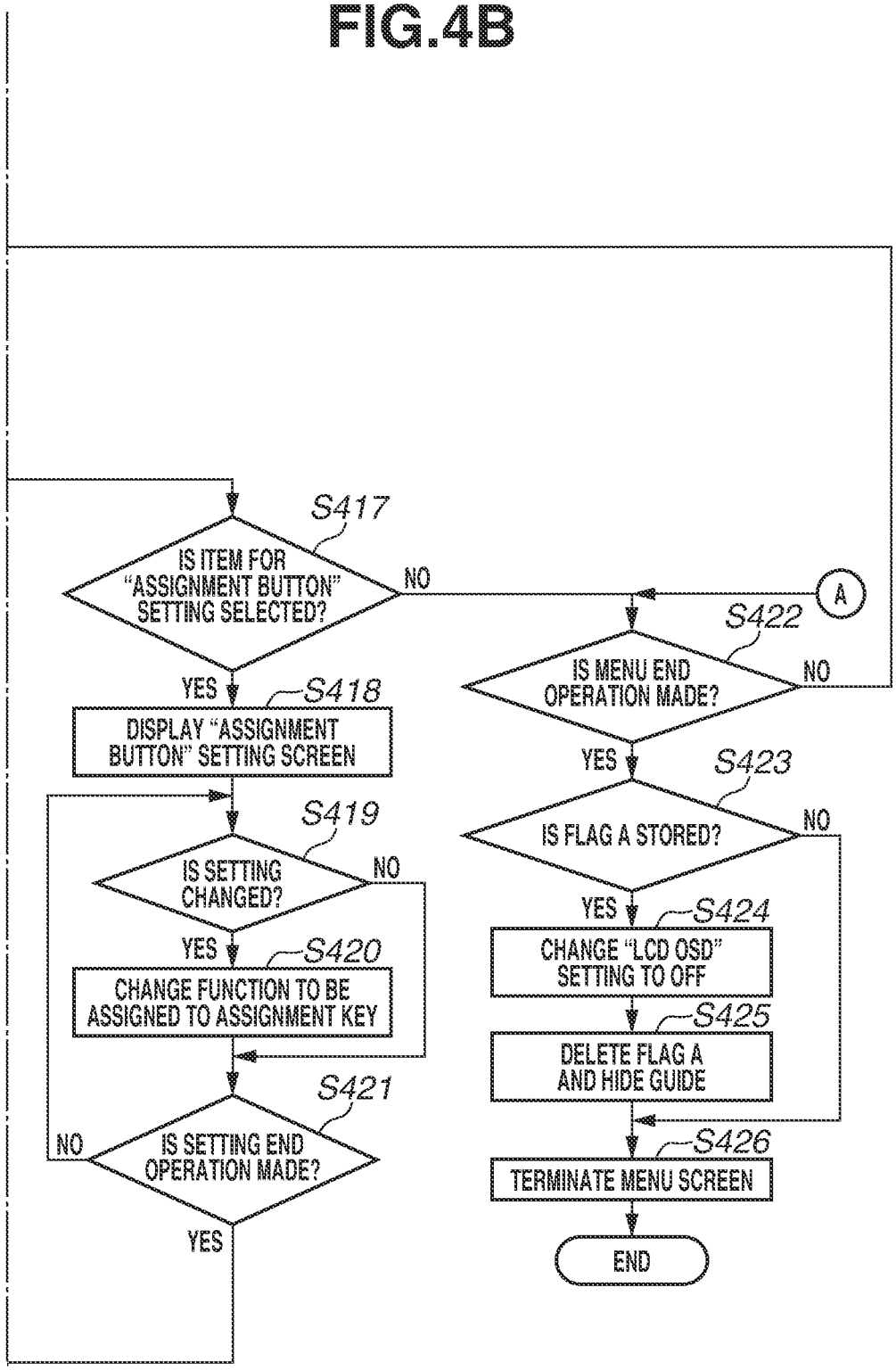

DISPLAY CONTROL APPARATUS AND METHOD FOR CONTROLLING THE SAME

BACKGROUND

Field of the Disclosure

The present disclosure relates to a technique in displaying information on a display unit.

Description of the Related Art

Imaging apparatuses such as a digital video camera and a digital camera have a function of displaying display elements, such as character strings and symbols for imaging settings, in a superimposed manner on a video image to be displayed on a display unit. Such a function is referred to as an on-screen display (OSD). Japanese Patent Application Laid-Open No. 2006-186717 discusses a menu setting by which OSD superimposition on a Serial Digital Interface (SDI) output or a High-Definition Multimedia Interface (HDMI) (registered trademark) output can be turned off.

According to Japanese Patent Application Laid-Open No. 2006-186717, the superimposed display can be turned off by the menu setting, whereas the once-hidden OSD makes settings difficult to be changed when the user wants to change the settings of other items or wants to turn on the superimposed display again. Suppose that the OSD superimposition is turned off as discussed in Japanese Patent Application Laid-Open No. 2006-186717, and in this state, a display unit is connected as discussed in Japanese Patent Application Laid-Open No. 2018-132769. In such a case, when no OSD is provided, the user is likely to get confused on how to display the OSD.

SUMMARY

Some embodiments are directed to enabling setting of information display on a display unit to be made with high operability. Some embodiments are also directed to providing information display in an easy-to-understand manner regardless of whether the display unit is connected.

According to an aspect of some embodiments, a display control apparatus includes a display control unit configured to control superimposed display of information on a captured image to be displayed on a display unit, a setting unit configured to switch between setting on for providing the superimposed display and setting off for not providing the superimposed display, and a control unit configured to control the superimposed display.

Further features of various embodiments will become apparent from the following description of exemplary embodiments with reference to the attached drawings.

BRIEF DESCRIPTION OF THE DRAWINGS

FIG. 3 is a flowchart illustrating details of image output processing for a liquid crystal display (LCD) panel according to the first exemplary embodiment.

FIG. 4, which includes FIGS. 4A and 4B, is a flowchart illustrating details of menu processing according to the first exemplary embodiment.

DESCRIPTION OF THE EMBODIMENTS

Exemplary embodiments will be described below with reference to the drawings.

A first exemplary embodiment deals with a digital video camera 100 that is an example of a display control apparatus to which an exemplary embodiment is applied.

Figure 1:
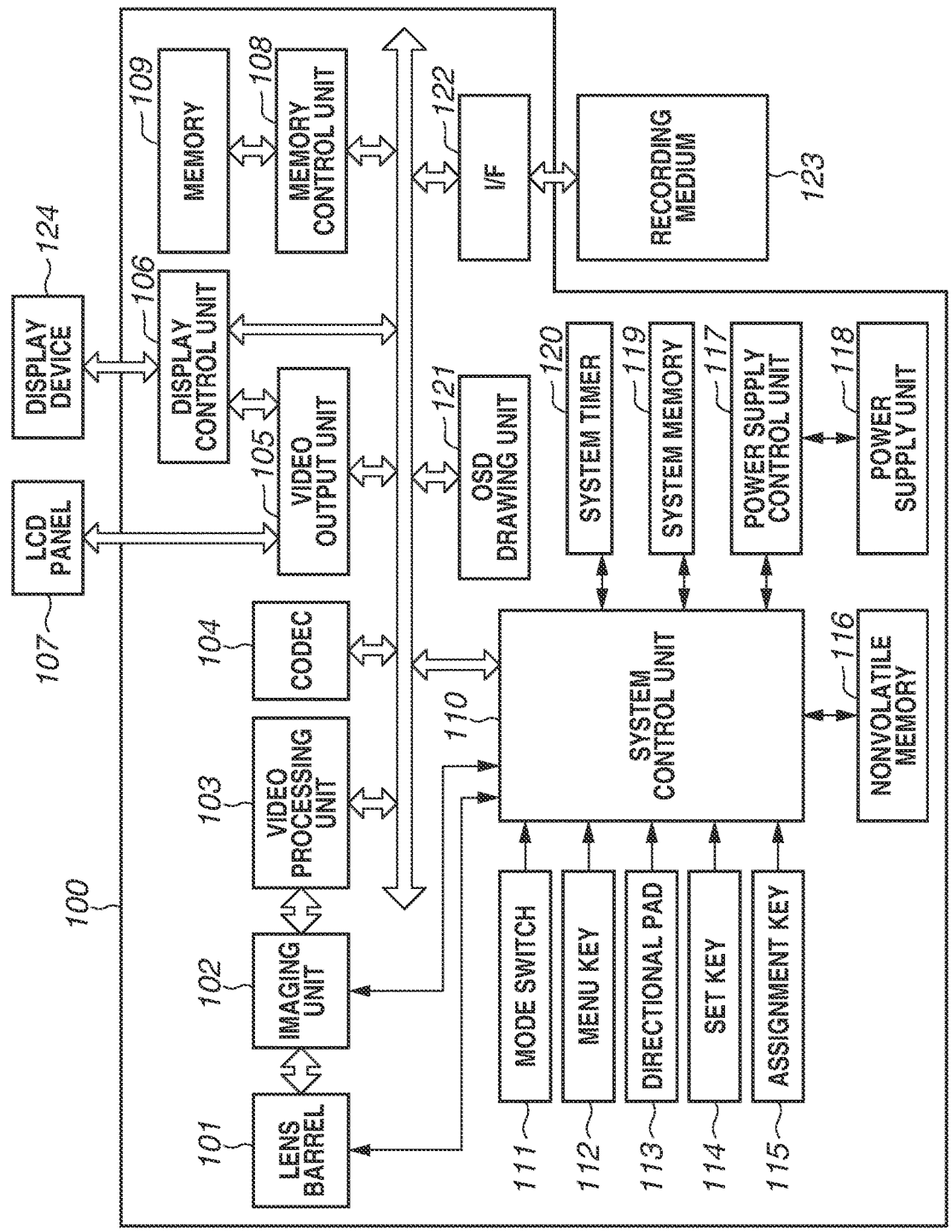
FIG. 1 is a diagram illustrating a configuration of a digital video camera according to a first exemplary embodiment.

FIG. 1 is a diagram illustrating a configuration of the digital video camera 100 according to the first exemplary embodiment.

A lens barrel 101 includes imaging lenses, including a focus lens and an image stabilization lens, and a diaphragm. The lens barrel 101 may be integral with a housing of the digital video camera 100 or be separable from the housing.

An imaging unit 102 includes an image sensor and an analog-to-digital (A/D) converter. The image sensor converts an optical image focused by the imaging lenses of the lens barrel 101 into an electrical signal. The A/D converter converts an analog signal into a digital signal.

A video processing unit 103 performs predetermined resize processing, trimming processing, color conversion processing, and distortion correction processing on video data from the imaging unit 102 or video data from a memory control unit 108, and stores the video data into a memory 109 via the memory control unit 108. The video processing unit 103 also performs predetermined calculation processing by using captured video data, and a system control unit 110 performs exposure control, distance measurement control, and image stabilization control based on the obtained calculation result. The predetermined calculation processing includes a function of detecting an object such as a face. Automatic focus (AF) processing, automatic exposure (AE) processing, and image stabilization processing are thereby performed. The image processing unit 103 also performs predetermined calculation processing based on the captured video data, and automatic white balance (AWB) processing is performed based on the obtained calculation result. The video processing unit 103 further performs processing for inputting video data obtained by a coder-decoder (codec) 104 decoding encoded video data, and performing resize processing and/or color conversion processing to generate new video data.

The codec 104 encodes video data generated by the video processing unit 103 by a moving image compression method such as Moving Picture Experts Group (MPEG)-2 or H.264, and decodes encoded video data from the memory control unit 108.

A video output unit 105 reads video data stored in the memory 109 via the memory control unit 108, and converts the video data into a video signal. The video output unit 105 can also attach metadata determined by the system control unit 110 to the video signal to be generated.

A display control unit 106 establishes connection with a display device 124 that is an external apparatus, and outputs the video signal. The connection between the digital video camera 100 and the display device 124 is established according to a Serial Digital Interface (SDI) standard. While the SDI standard is used here, wired and wireless other transmission standards may be used as alternatives. For example, the digital video camera 100 and the display device 124 may be connected according to a High-Definition Multimedia Interface (HDMI)® standard, and the video signal and information about the signal standard may be exchanged via an HDMI cable. The digital video camera 100 and the display device 124 may be connected by a wireless technique, such as a wireless local area network (LAN).

A liquid crystal display (LCD) panel 107 is a display unit detachably attached to the housing of the digital video camera 100. The system control unit 110 can detect an attached state and a non-attached state of the LCD panel 107. The LCD panel 107 can display contents that are the same as those of the display device 124 or display contents different from those of the display device 124. The digital video camera 100 can be reduced in size by detaching the LCD panel 107, depending on imaging conditions.

The memory control unit 108 has a function of arbitrating access requests from various units to the memory 109.

The memory 109 stores pieces of video data to be handled by the video processing unit 103, the codec 104, the video output unit 105, and an on-screen display (OSD) drawing unit 121. The memory 109 also provides the function of temporarily storing encoded video data output from the codec 104 and encoded video data read from a recording medium 123. The memory 109 has a sufficient recording capacity to temporarily store moving images and audio for a predetermined amount of time.

The system control unit 110 controls the entire digital video camera 100. For example, the system control unit 110 performs display control by controlling the memory 109, the OSD drawing unit 121, and the video output unit 105. The system control unit 110 controls the units by reading a program stored in a nonvolatile memory 116 and executing the program, and thereby implements various operations of the present exemplary embodiment. In the present exemplary embodiment, the system control unit 110 functions as a display control unit, a setting unit, and a storage control unit according to the present exemplary embodiment by executing the program. The system control unit 110 may include a plurality of central processing unit (CPU) cores. In such a case, the plurality of CPU cores can process tasks described in the program in a shared manner.

A mode switch 111 is a switch for selecting an operation mode of the digital video camera 100. Any one of the following modes is determined based on the position of the mode switch 111 and notified to the system control unit 110: a camera mode, a playback mode, and a power-off mode.

Figure 5A:
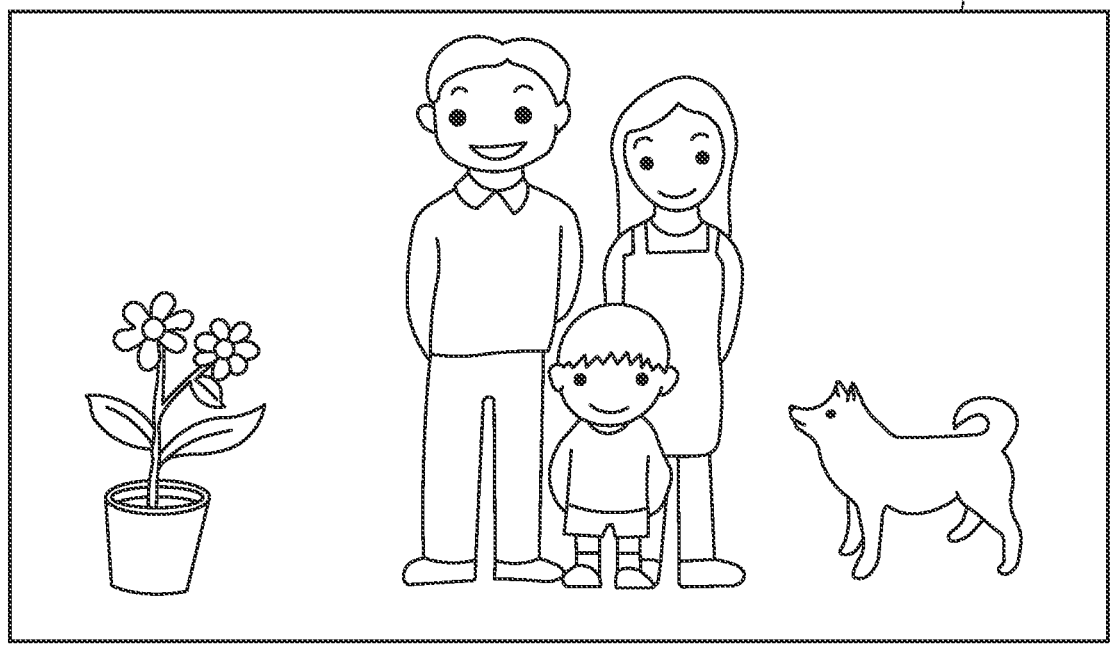
FIG. 5A is a diagram illustrating an example of a screen.
Figure 5B:
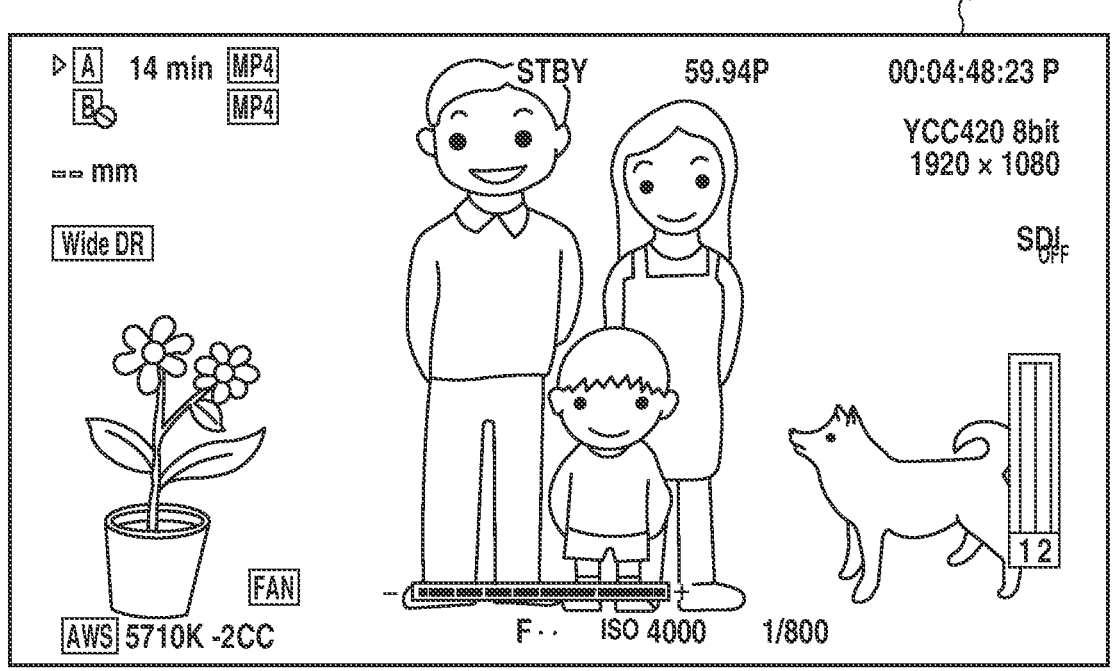
FIG. 5B is a diagram illustrating an example of a screen.
Figure 5C:
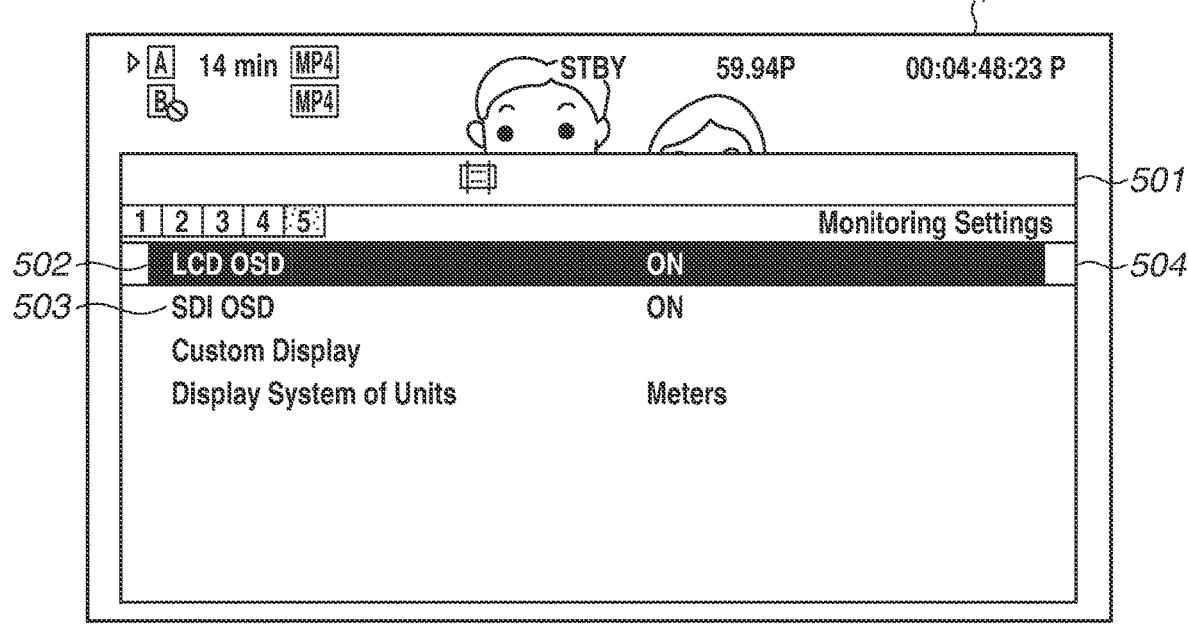
FIG. 5C is a diagram illustrating an example of a screen.

A menu key 112 is a key for giving instructions to open and close a menu screen to be displayed as an OSD on a video image (captured image) displayed on the LCD panel 107. Various settings of the digital video camera 100 can be changed by operations on the menu screen. For example, a user can select the signal standard of a video image to be recorded and select the signal standard of a video image to be output to the display device 124. As another example, as illustrated in FIG. 5C to be described below, an on/off setting of the OSD on the LCD panel 107 (hereinafter, referred to as an "LCD OSD" setting) can be made from the menu screen. Similarly, an on/off setting of the OSD on the display device 124 (hereinafter, referred to an "SDI OSD" setting) can be made from the menu screen.

A directional pad 113 is used for various uses. For example, the directional pad 113 is used in instructing movement of a cursor displayed on the menu screen.

A set key 114 is used for various uses. For example, the set key 114 is used to give an instruction to accept an item or a setting value selected by the cursor on the menu screen.

An assignment key 115 is assigned a desired function from the menu screen in advance. This enables the function to be directly called or the setting of the function to be changed by operating the assignment key 115 without opening the menu screen. If the assignment key 115 is assigned a function of changing the "LCD OSD" setting, the "LCD OSD" setting can be immediately switched by pressing the assignment key 115.

The nonvolatile memory 116 is an electrically erasable and recordable nonvolatile memory. Examples include an electrically erasable programmable read-only memory (EEPROM). Operating constants of the system control unit 110 and a program are recorded in the nonvolatile memory 116. As employed herein, the program refers to one for performing various flowcharts to be described below in the present exemplary embodiment.

A power supply control unit 117 includes a battery detection circuit, a direct-current-to-direct-current (DC-DC) converter, and a switch circuit for switching blocks to be energized, and detects the presence or absence of a battery attached, the type of battery, and the remaining battery level. The power supply control unit 117 also controls the DC-DC converter based on the detection results and instructions from the system control unit 110, and supplies predetermined voltages to various components, including the recording medium 123, for predetermined periods.

A power supply unit 118 includes a primary battery, such as an alkaline battery or a lithium battery; a secondary battery, such as a nickel-cadmium (NiCd) battery, a nickel metal halide (NiMH) battery, or a lithium-ion (Li) battery; and/or an alternating current (AC) adapter.

A system memory 119 is a random access memory (RAM), for example. The operating constants and variables of the system control unit 110 and the program read from the nonvolatile memory 116 are loaded into the system memory 119. The system memory 119 and the memory 109 may be the same memory. In such a case, since access is arbitrated by the memory control unit 108, an additional small capacity memory capable of fast access may be directly connected to the system control unit 110.

A system timer 120 is a clocking unit that measures time used for various types of control and the time of a built-in clock.

To provide an OSD for displaying display elements on a video image in a superimposed manner, the OSD drawing unit 121 renders character strings and icons indicating statuses and settings of the digital video camera 100, various frames, and markers onto video data in the memory 109. The nonvolatile memory 116 stores the character strings and icons, which the OSD drawing unit 121 reads and renders.

An interface (I/F) 122 is an I/F with the recording medium 123.

The recording medium 123 is a recording medium intended for the encoded video data stored in the memory 109 to be recorded on via the I/F 122 and for encoded video data and accompanying data recorded thereon to be read and transferred to the memory 109 by the I/F 122. The recording medium 123 may be a memory card, a hard disk drive, or a disc loaded to the digital video camera 100, or a flash memory or a hard disk drive built in the digital video camera 100.

The display device 124 is an external apparatus connected to the digital video camera 100, and displays the input video signal. The display device 124 includes a liquid crystal panel or an organic electroluminescence (EL) panel. While the display device 124 here is described to be connected to the digital video camera 100, an external recording apparatus for recording video signals outside the digital video camera 100 may be connected instead of the display device 124.

Figure 2:
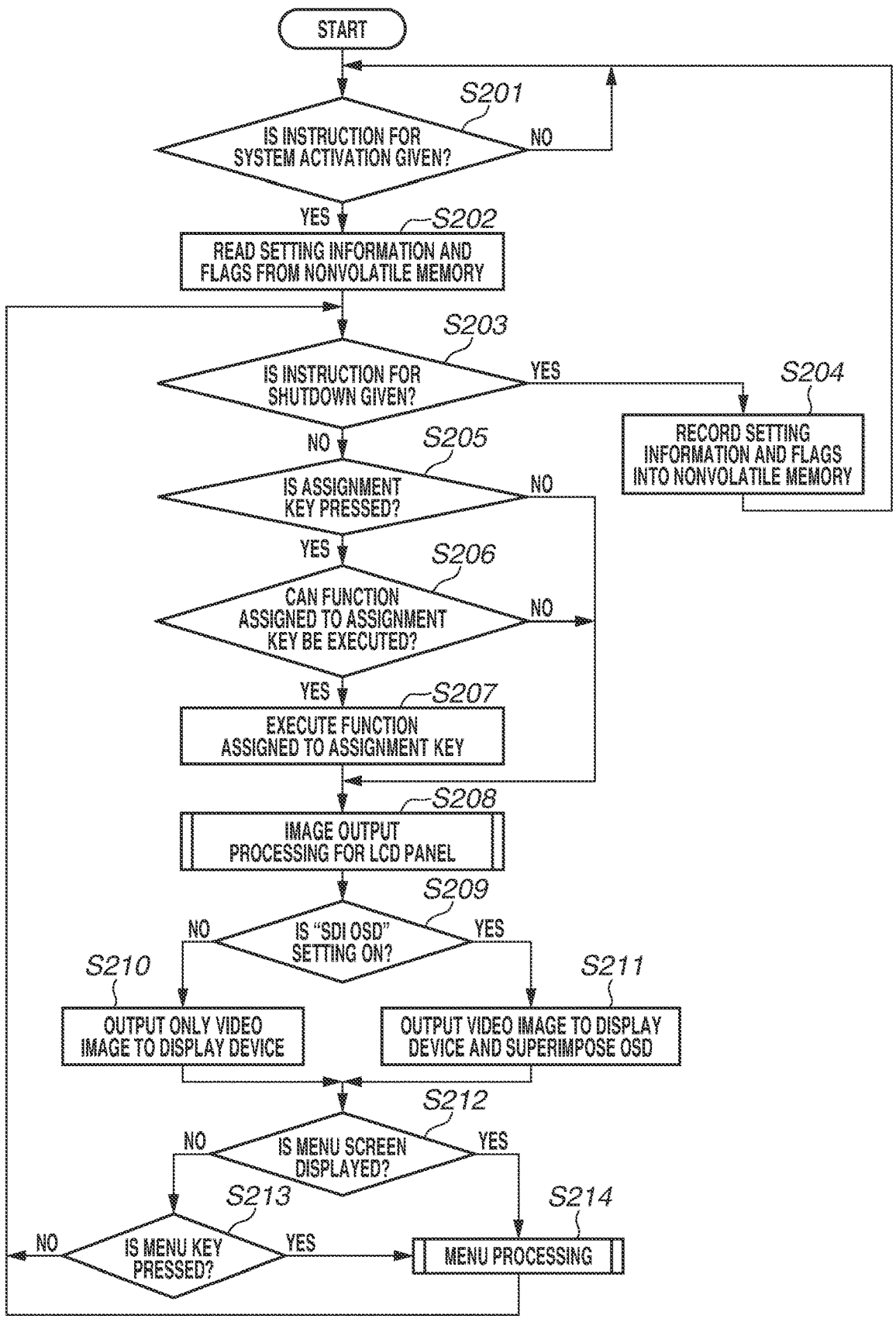
FIG. 2 is a flowchart illustrating an operation of the digital video camera according to the first exemplary embodiment.

FIGS. 2 to 4 are flowcharts illustrating an operation of the digital video camera 100. The flowcharts are implemented by the system control unit 110 loading the program stored in the nonvolatile memory 116 into the system memory 119, executing the program, and thereby controlling the components of the digital video camera 100.

FIGS. 5A to 5F are diagrams illustrating examples of screens displayed on the LCD panel 107 and the display device 124 in the flowcharts of FIGS. 2 to 4. FIGS. 5A to 5F will be described in detail in conjunction with a description of the flowcharts of FIGS. 2 to 4.

FIG. 2 is a flowchart illustrating the operation of the digital video camera 100 according to the first exemplary embodiment.

In S201, the system control unit 110 waits until an instruction for system activation is given from the mode switch 111. If an instruction for system activation is given (YES in S201), the processing proceeds to S202.

In S202, the system control unit 110 reads setting information and flags recorded in the nonvolatile memory 116 into the system memory 119.

In S203, the system control unit 110 determines whether an instruction for shutdown is given from the mode switch 111. If the instruction for shutdown is given (YES in S203), the processing proceeds to S204. If the instruction for shutdown is not given (NO in S203), the processing proceeds to S205.

In S204, the system control unit 110 records the setting information and the flags stored in the system memory 119 into the nonvolatile memory 116 that is a recording medium retaining data even in a power-off state. As employed herein, the setting information includes the "LCD OSD" setting. The processing then returns to S201.

In S205, the system control unit 110 determines whether the assignment key 115 is pressed. If the assignment key is pressed (YES in S205), the processing proceeds to S206. If the assignment key is not pressed (NO in S205), the processing proceeds to S208.

In S206, the system control unit 110 determines whether the function assigned to the assignment key 115 can be executed. For example, suppose that the function assigned to the assignment key 115 is to change the "LCD OSD" setting. In such a case, if the operation mode of the digital video camera 100 is a playback standby state in the playback mode, the function is unable to be executed and the determination of this is false (NO). A change to the "LCD OSD" setting by a user operation is also prohibited in the non-attached state where the LCD panel 107 is not attached to the digital video camera 100. If the function assigned to the assignment key 115 can be executed (YES in S206), the processing proceeds to S207. If the function assigned to the assignment key 115 is unable to be executed (NO in S206), the processing proceeds to S208.

In S207, the system control unit 110 executes the function assigned to the assignment key 115. If the function assigned to the assignment key 115 is to change the "LCD OSD" setting and the "LCD OSD" setting before the key depression is on, the "LCD OSD" setting is switched to off by the key depression. If the "LCD OSD" setting before the key depression is off, the "LCD OSD" setting is switched to on by the key depression. The setting state is stored in the system memory 119.

In S208, the system control unit 110 performs image output processing for the LCD panel 107. Details of the image output processing for the LCD panel 107 will be described below with reference to FIG. 3.

In S209 to S211, the system control unit 110 performs image output processing for the display device 124.

Specifically, in S209, the system control unit 110 determines whether the "SDI OSD" setting is on. If the "SDI OSD" setting is off (NO in S209), the processing proceeds to S210. If the "SDI OSD" setting is on (YES in S209), the processing proceeds to S211.

In S210, the system control unit 110 performs display control to output only a video image to the display device 124. Here, the display device 124 displays only objects as illustrated in FIG. 5A.

In S211, the system control unit 110 performs display control to output the video image to the display device 124 and superimpose an OSD on the video image. Here, the display device 124 displays display elements, such as character strings and icons, in a superimposed manner on the objects as illustrated in FIG. 5B.

In S212, the system control unit 110 determines whether the menu screen is displayed. If the menu screen is not displayed (NO in S212), the processing proceeds to S213. If the menu screen is displayed (YES in S212), the processing proceeds to S214.

In S213, the system control unit 110 determines whether the menu key 112 is pressed to call the menu screen. If the menu key 112 is pressed (YES in S213), the processing proceeds to S214. If the menu key 112 is not pressed (NO in S213), the processing returns to S203.

In S214, the system control unit 110 performs menu processing. The processing then returns to S203. Details of the menu processing will be described below with reference to FIGS. 4A and 4B.

FIG. 3 is a flowchart illustrating details of the image output processing for the LCD panel 107 in S208 of FIG. 2.

In S301, the system control unit 110 determines whether the LCD panel 107 is attached to the digital video camera 100. If the LCD panel 107 is not attached (NO in S301), the processing proceeds to S302. If the LCD panel 107 is attached (YES in S301), the processing proceeds to S303. The determination of S301 may be made based on whether the digital video camera 100 is in a state capable of display control on the LCD panel 107, like whether the digital video camera 100 is in a connection state or a non-connection state, instead of whether the LCD panel 107 is physically attached to the digital video camera 100.

In S302, the system control unit 110 disables the "LCD OSD" setting to prohibit a setting change by a user operation. This can avoid the inconvenience that the "LCD OSD" setting, if automatically changed in S305 to be described below, is restored by a setting change made by a user operation.

In S304, the system control unit 110 determines whether the "LCD OSD" setting is on. If the "LCD OSD" setting is off (NO in S304), the processing proceeds to S305. If the "LCD OSD" setting is on (YES in S304), the processing exits the flowchart.

In S305, the system control unit 110 changes the "LCD OSD" setting from off to on. The processing then exits the flowchart.

In S303, the system control unit 110 enables the "LCD OSD" setting to permit a setting change by a user operation.

In S306, the system control unit 110 determines whether the operation mode of the digital video camera 100 is the camera mode. If the operation mode is the camera mode (YES in S306), the processing proceeds to S307. If the operation mode is not the camera mode (e.g., is the playback mode) (NO in S306), the processing proceeds to S309.

In S307, like S304, the system control unit 110 determines whether the "LCD OSD" setting is on. If the "LCD OSD" setting is off (NO in S307), the processing proceeds to S308. If the "LCD OSD" setting is on (YES in S307), the processing proceeds to S309.

In S308, the system control unit 110 performs display control to output only the video image to the LCD panel 107. Here, the LCD panel 107 displays only the objects as illustrated in FIG. 5A. The processing then exits the flowchart.

In S309, the system control unit 110 performs display control to output the video image to the LCD panel 107 and superimpose the OSD on the video image. Here, the LCD panel 107 superimposes and displays the display elements, such as character strings and icons, on the objects as illustrated in FIG. 5B. The processing then exits the flowchart.

Figure 4A:
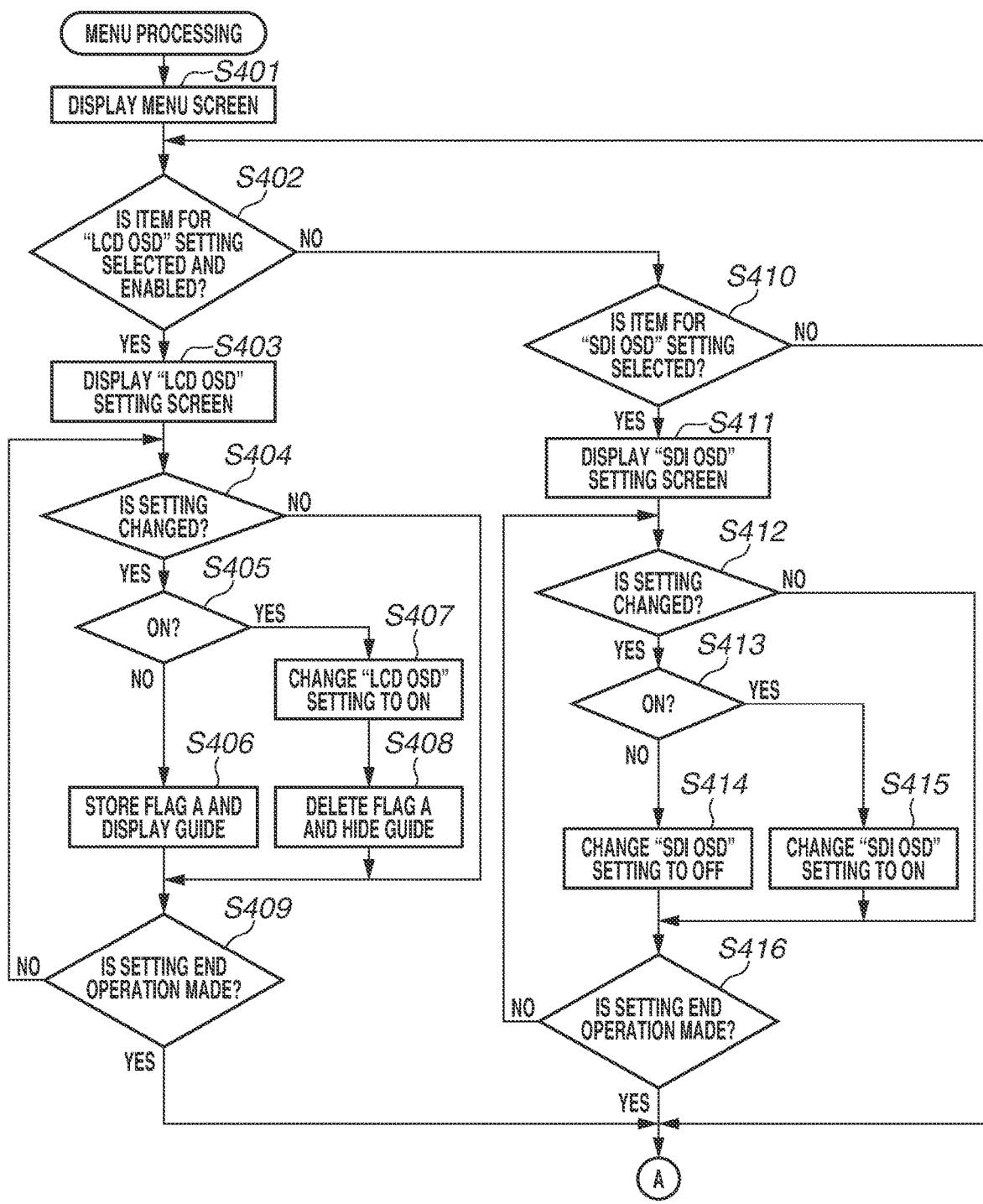

FIG. 4, which includes FIGS. 4A and 4B, is a flowchart illustrating details of the menu processing in S214 of FIG. 2. In S401, the system control unit 110 displays the menu screen as illustrated in FIG. 5C if the respective OSD settings of the LCD panel 107 and the display device 124 are on. A frame 501 surrounding all menu elements displays an item 502 for the "LCD OSD" setting and an item 503 for the "SDI OSD" setting. The character string of each item is displayed in white if the item is enabled, and in gray (in the diagram, black) if the item is disabled. A cursor 504 for selecting an item is displayed, and the selected item can be changed by using the directional pad 113 and accepted by pressing the set key 114.

In S402, the system control unit 110 determines whether the item 502 for the "LCD OSD" setting is selected on the menu screen and enabled. Whether the item 502 is enabled is determined because the "LCD OSD" setting is disabled or enabled as described in the flowchart of FIG. 3. If the item 502 for the "LCD OSD" setting is selected and enabled (YES in S402), the processing proceeds to S403. If the item 502 for the "LCD OSD" setting is not selected or if the item 502 for the "LCD OSD" setting is selected but not enabled (NO in S402), the processing proceeds to S410.

Figure 5D:
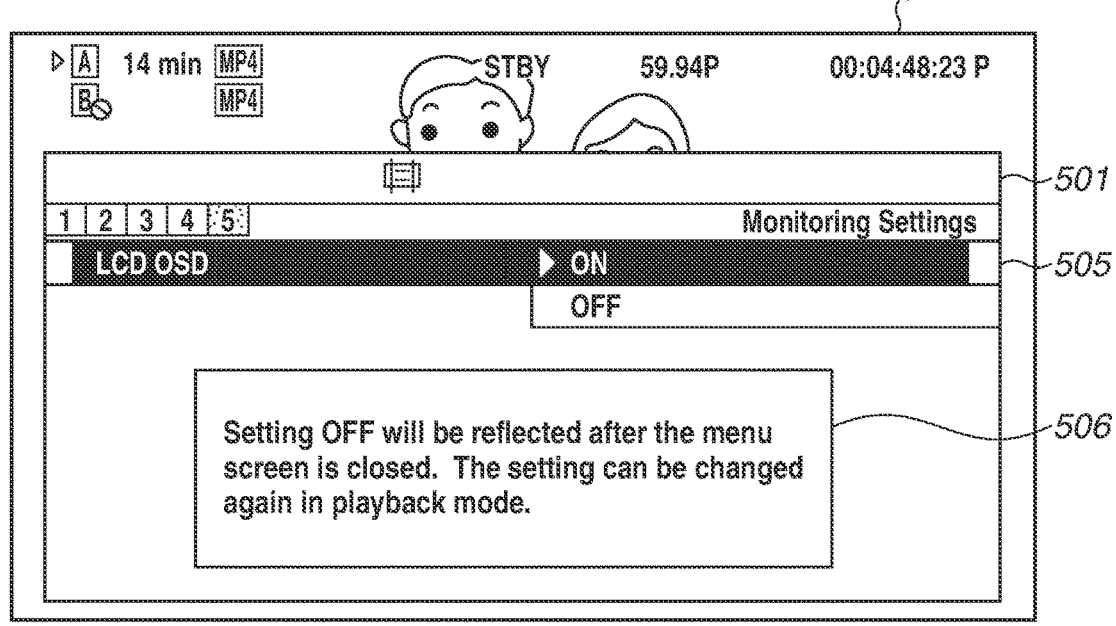
FIG. 5D is a diagram illustrating an example of a screen.

In S403, the system control unit 110 displays an "LCD OSD" setting screen as illustrated in FIG. 5D. A cursor 505 for selecting a status item of the "LCD OSD" setting is displayed, and the selected item can be changed by using the directional pad 113 and accepted by pressing the set key 114. A guide 506 is displayed as well. The guide 506 indicates that the setting changed on the menu screen will be reflected after the menu screen disappears, and that the setting can be changed again in the playback mode. This guide 506 can inform the user that the reflection timing of the setting change is different from that of other items, and avoid confusing the user about a restoring operation if the setting change is reflected and the menu screen is no longer visible on the LCD panel 107.

In S404, the system control unit 110 determines whether the setting is changed on the "LCD OSD" setting screen of FIG. 5D. If the setting is changed (YES in S404), the processing proceeds to S405. If the setting is not changed (NO in S404), the processing proceeds to S409.

In S405, the system control unit 110 determines whether the result of the setting change in S404 is on. If the result is off (NO in S405), the processing proceeds to S406. If the result is on (YES in S405), the processing proceeds to S407.

Figure 5E:
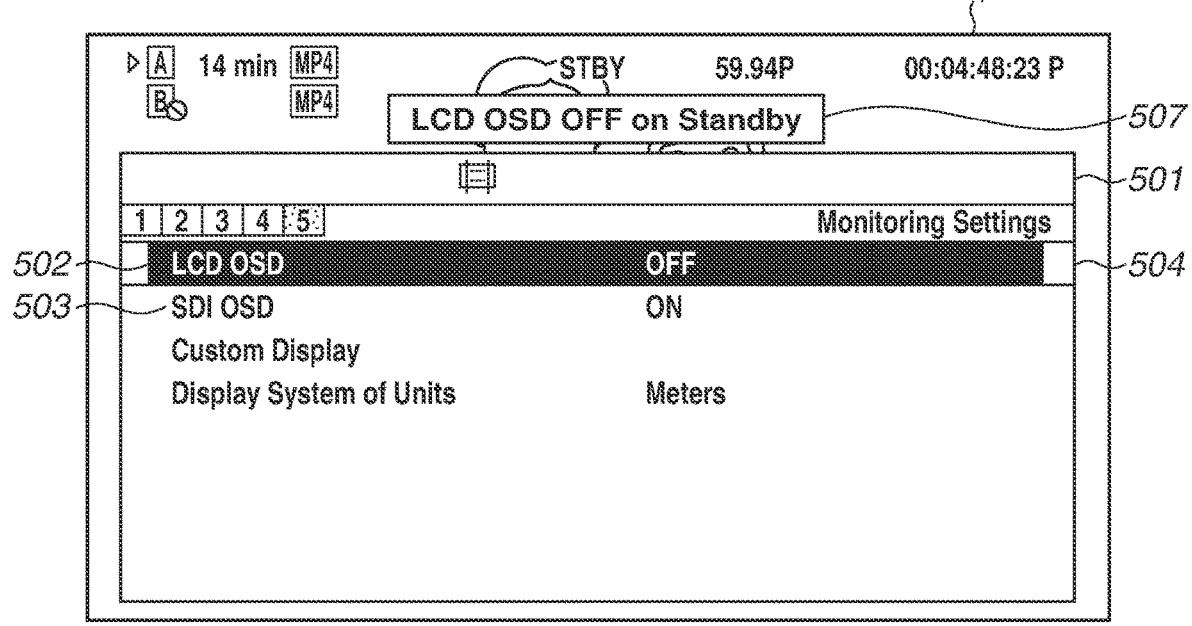
FIG. 5E is a diagram illustrating an example of a screen.

In S406, the system control unit 110 stores in the system memory 119 a flag A indicating that the "LCD OSD" setting is to be changed to off, and displays a guide 507 as illustrated in FIG. 5E. FIG. 5E illustrates the resulting screen when the menu screen is displayed again in S401 after S406. Here, if the flag A is stored in the system memory 119, the system control unit 110 displays the changed setting "off" in the item 502 for the "LCD OSD" setting. This can inform the user that the setting change in S404 is properly accepted, whereas the OSD operation on the LCD panel 107 is still unchanged. Displaying the guide 507 can inform the user that the reflection timing of the setting change of only the "LCD OSD" setting is different from that of the other items, and that the setting change is on standby.

In S407, the system control unit 110 changes the "LCD OSD" setting to on.

In S408, the system control unit 110 deletes the flag A if the flag A has been stored in S406, and hides the guide 507. This can cancel the processing of S406, whereby the user can undo an erroneous operation.

In S409, the system control unit 110 determines whether a setting end operation to end making the "LCD OSD" setting is made. The setting change operation in S404 may serve as this setting end operation. If the setting end operation is made (YES in S409), the processing proceeds to S422. If the setting end operation is not made (NO in S409), the processing returns to S404.

In S410, the system control unit 110 determines whether the item 503 for the "SDI OSD" setting is selected on the menu screen. If the item 503 for the "SDI OSD" setting is selected (YES in S410), the processing proceeds to S411. If the item 503 for the "SDI OSD" setting is not selected (NO in S410), the processing proceeds to S417.

Figure 5F:
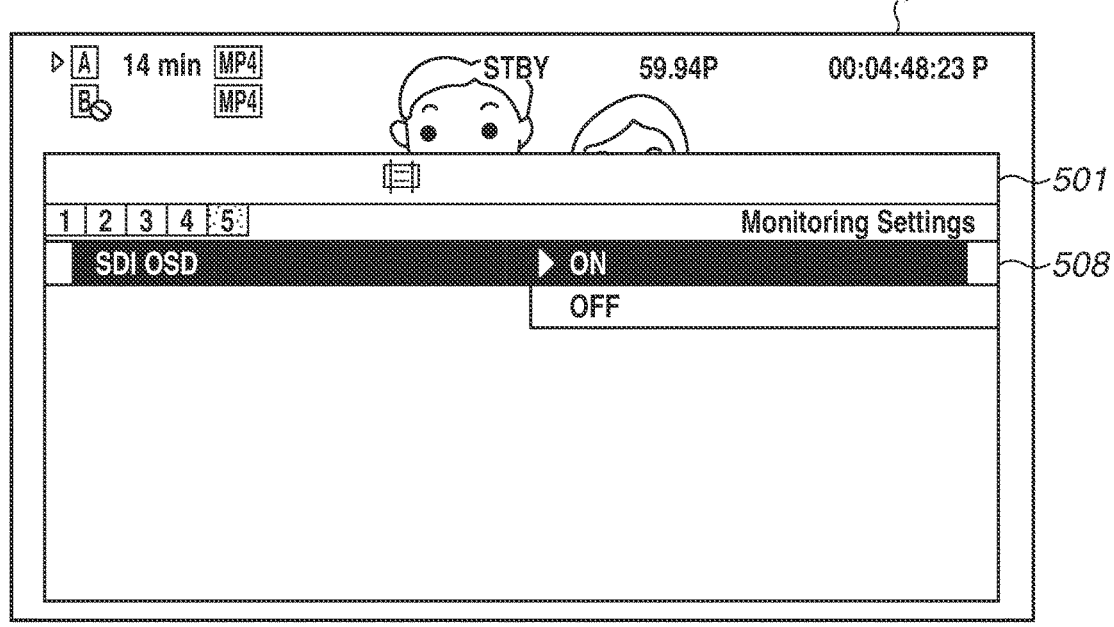
FIG. 5F is a diagram illustrating an example of a screen.

In S411, the system control unit 110 displays an "SDI OSD" setting screen as illustrated in FIG. 5F. A cursor 508 for selecting a status item of the "SDI OSD" setting is displayed, and the selected item can be changed by using the directional pad 113 and accepted by pressing the set key 114.

In S412, the system control unit 110 determines whether the setting is changed on the "SDI OSD" setting screen of FIG. 5F. If the setting is changed (YES in S412), the processing proceeds to S413. If the setting is not changed (NO in S412), the processing proceeds to S416.

In S413, the system control unit 110 determines whether the result of the setting change in S412 is on. If the result is off (NO in S413), the processing proceeds to S414. If the result is on (YES in S413), the processing proceeds to S415.

In S414, the system control unit 110 changes the "SDI OSD" setting to off.

In S415, the system control unit 110 changes the "SDI OSD" setting to on.

In S416, the system control unit 110 determines whether a setting end operation to end making the "SDI OSD" setting is made. A setting change operation in S412 may serve as this setting end operation. If the setting end operation is made (YES in S416), the processing proceeds to S422. If the setting end operation is not made (NO in S416), the processing returns to S412.

In S417, the system control unit 110 determines whether an item for an "assignment button" setting is selected on the menu screen. If the item for the "assignment button" setting is selected (YES in S417), the processing proceeds to S418. If the item for the "assignment button" setting is not selected (NO in S417), the processing proceeds to S422.

In S418, the system control unit 110 displays an "assignment button" setting screen.

In S419, the system control unit 110 determines whether the setting is changed on the "assignment button" setting screen. If the setting is changed (YES in S419), the processing proceeds to S420. If the setting is not changed (NO in S419), the processing proceeds to S421.

In S420, the system control unit 110 changes the function to be assigned to the assignment key 115 based on the result of the setting change in S419. If the function to be assigned is to change the "LCD OSD" setting, the OSD operation on the LCD panel 107 in S205, S206, and S207 can be changed.

In S421, the system control unit 110 determines whether a setting end operation to end making the "assignment button" setting is made. A setting change operation in S419 may serve as this setting end operation. If the setting end operation is made (YES in S421), the processing proceeds to S422. If the setting end operation is not made (NO in S421), the processing returns to S419.

In S422, the system control unit 110 determines whether a menu end operation is made. The menu end operation is made by pressing the menu key 112. If the menu end operation is made (YES in S422), the processing proceeds to S423. If the menu end operation is not made (NO in S422), the processing returns to S402.

In S423, the system control unit 110 determines whether the flag A is stored in S406. If the flag A is stored (YES in S423), the processing proceeds to S424. If the flag A is not stored (NO in S423), the processing proceeds to S426.

In S424, the system control unit 110 changes the "LCD OSD" setting to off.

As described above, by changing the setting in S424 after S422, the LCD OSD is prevented from being immediately turned off in response to the setting change, and is turned off after an operation for returning to a live view (LV) screen is made. This prevents the LCD OSD from being unintentionally turned off until the user makes an operation for changing other setting items or turning the LCD OSD on and tries to return to the LV screen.

In S425, the system control unit 110 deletes the flag A stored in S406, and hides the guide 507.

In S426, the system control unit 110 ends the menu screen and the screen state transitions to the screen state of FIG. 5A or 5B. The processing then exits the flowchart.

While the menu screen is described to be ended based on the menu end operation, the menu screen may be ended, for example, based on the operation for changing the "LCD OSD" setting to off on the "LCD OSD" setting screen.

As described above, the setting of the information display on the LCD panel 107 can be made with high operability, and the OSD function on the LCD panel 107 can be made convenient. Moreover, as described above, if the LCD panel 107 is detected to be in the non-attached state, an automatic change is made to set the OSD on the LCD panel 107 on. In such a manner, information display can be provided in an easy-to-understand manner regardless of whether the LCD panel 107 is connected, whereby the OSD function on the LCD panel 107 can be made convenient.

Specifically, after the LCD panel 107 is attached, the digital video camera 100 can be operated with the "LCD OSD" setting on. This can avoid situations where the OSD including the menu screen does not appear on the LCD panel 107 and the user becomes uncertain or confused about the operation for changing the "LCD OSD" setting to on. Since the LCD panel 107 is often attached or detached at timing when the imaging situation changes, the possibility of giving the user the impression that the "LCD OSD" setting is changed at unintended timing without permission is low.

The digital video camera 100 stores the setting state in the nonvolatile memory 116 even during power-off. The "LCD OSD" setting therefore will not be inadvertently changed by a power supply operation without attachment or detachment of the LCD panel 107. This enables operations desirable for respective use cases, even when the user operates the digital video camera 100 with the "LCD OSD" setting intentionally set to off.

The automatic change of the OSD setting is applied to the LCD panel 107 but not to the display device 124 connected according to the SDI standard. The OSD setting is not automatically changed if the display device 124 is disconnected. The reason is that an external recording apparatus can be connected instead of the display device 124. In most cases, a video image without OSD superimposition is desirably input to the external recording apparatus, and the automatic change of the OSD setting based on the connection state is often undesirable.

After the "LCD OSD" setting is changed from on to off on the menu screen, the menu screen continues to be displayed on the LCD panel 107. The display operation is not switched to hide the OSD until an operation to terminate the menu screen is made. This can prevent the menu screen from being invisible and can avoid erroneous operations. If the "LCD OSD" setting is changed from off to on, the setting is immediately reflected since, unlike the foregoing change, there is no concern of the menu screen becoming invisible. This enables operations expected by the user.

If the "LCD OSD" setting is changed by a predetermined operation other than the operation on the menu screen, such as pressing of the assignment key 115, the setting is immediately reflected without waiting for a condition such as the termination of the menu screen. If the OSD on the LCD panel 107 suddenly disappears due to the pressing of the assignment key 115, the OSD can be restored by pressing the assignment key 115 again. This does not confuse the user but rather enables changes in the operation state as expected by the user.

The foregoing various controls described to be performed by the system control unit 110 may be performed by a single piece of hardware. A plurality of pieces of hardware may control the entire digital video camera 100 by sharing of processing.

While the present exemplary embodiment has been described in detail above, some embodiments are not limited to this specific exemplary embodiment. Various modifications are made without departing from the gist of the present exemplary embodiment. The foregoing exemplary embodiment is just one exemplary embodiment. Also, exemplary embodiments can be combined, as appropriate.

The foregoing exemplary embodiment is described to be applied to a digital video camera that is an imaging apparatus. However, such an example is not restrictive, and the present exemplary embodiment can be applied to any display control apparatus. Specifically, the present exemplary embodiment can be applied to a personal computer, a personal digital assistant (PDA), a mobile phone terminal, a portable image viewer, a printer apparatus equipped with a display, a digital photo frame, a music player, a game machine, an electronic book reader, a tablet terminal, a smartphone, a projector apparatus, and a home appliance and a vehicle-mounted device equipped with a display.

Next, a second exemplary embodiment will be described.

A digital video camera according to the second exemplary embodiment has a similar configuration to that of the digital video camera 100 according to the first exemplary embodiment. Similar components are hereinafter denoted by the same reference numerals, and a description thereof will be omitted.

Basic operations of the digital video camera according to the second exemplary embodiment are similar to those of the first exemplary embodiment. Operations different from those of the first exemplary embodiment will be mainly described below.

In the second exemplary embodiment, the image output processing for the LCD panel 107 in S208 of FIG. 2 is different from that in the first exemplary embodiment.

Figure 6:
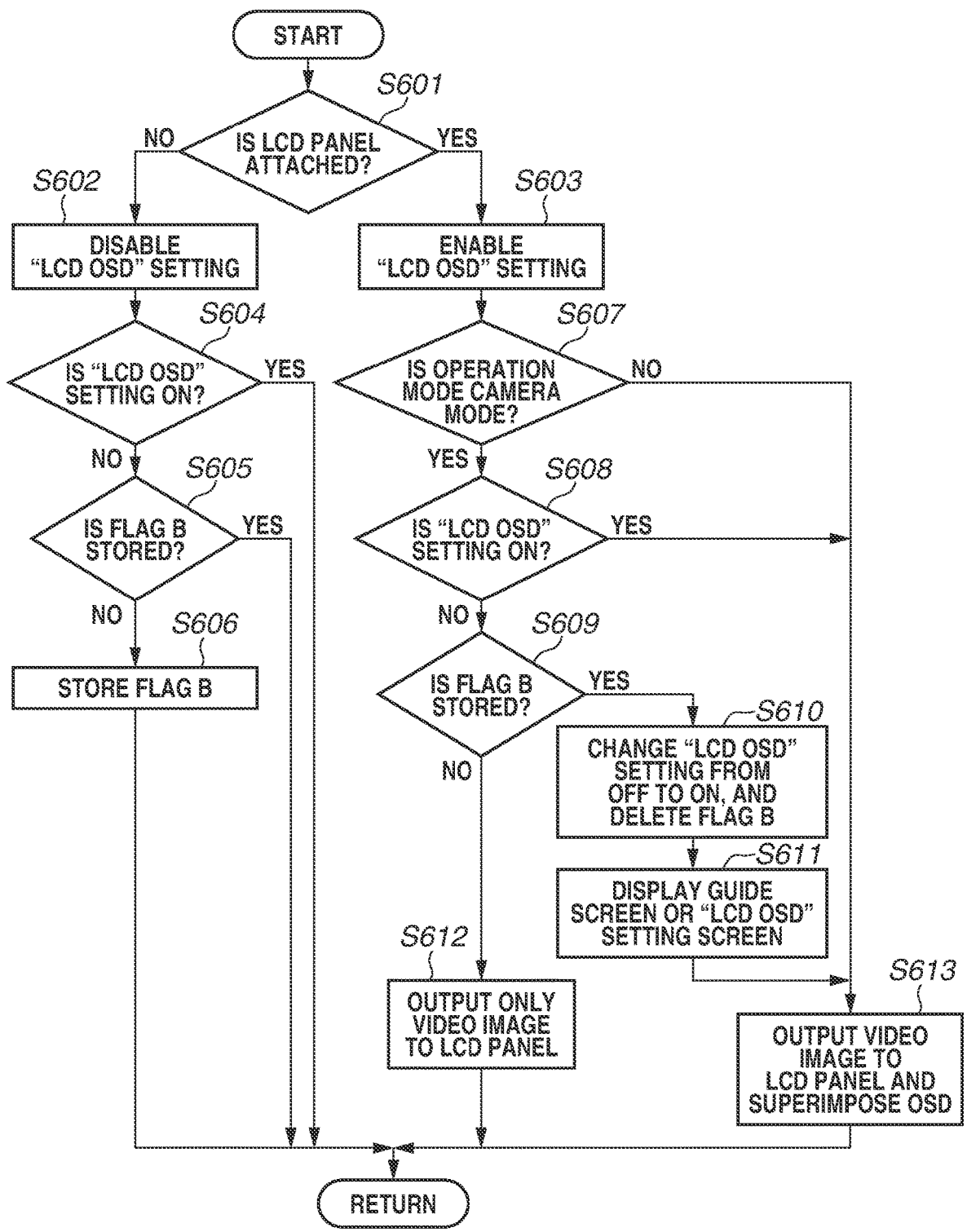
FIG. 6 is a flowchart illustrating details of image output processing for an LCD panel according to a second exemplary embodiment.

FIG. 6 is a flowchart illustrating details of the image output processing for the LCD panel 107 in S208 of FIG. 2.

In S601, the system control unit 110 determines whether the LCD panel 107 is attached to the digital video camera 100. If the LCD panel 107 is not attached (NO in S601), the processing proceeds to S602. If the LCD panel 107 is attached (YES in S601), the processing proceeds to S603.

In S602, the system control unit 110 disables the "LCD OSD" setting to prohibit a setting change by a user operation. This can avoid the inconvenience that a setting change made by the user without the LCD panel 107 attached is cancelled in S610 to be described below.

In S604, the system control unit 110 determines whether the "LCD OSD" setting is on. If the "LCD OSD" setting is off (NO in S604), the processing proceeds to S605. If the "LCD OSD" setting is on (YES in S604), the processing exits the flowchart.

In S605, the system control unit 110 determines whether a flag B indicating that the "LCD OSD" setting is to be changed to on is stored. If the flag B is not stored (NO in S605), the processing proceeds to S606. If the flag B is stored (YES in S605), the processing exits the flowchart.

In S606, the system control unit 110 stores the flag B into the system memory 119. The processing then exits the flowchart.

In S603, the system control unit 110 enables the "LCD OSD" setting to permit a setting change by a user operation.

In S607, the system control unit 110 determines whether the operation mode of the digital video camera 100 is the camera mode. If the operation mode is the camera mode (YES in S607), the processing proceeds to S608. If the operation mode is not the camera mode (e.g., is the playback mode) (NO in S607), the processing proceeds to S613.

In S608, like S604, the system control unit 110 determines whether the "LCD OSD" setting is on. If the "LCD OSD" setting is off (NO in S608), the processing proceeds to S609. If the "LCD OSD" setting is on (YES in S608), the processing proceeds to S613.

In S609, the system control unit 110 determines whether the flag B is stored. If the flag B is stored (YES in S609), the processing proceeds to S610. If the flag B is not stored (NO in S609), the processing proceeds to S612.

In S610, the system control unit 110 changes the "LCD OSD" setting from off to on, and deletes the flag B from the system memory 119.

Figure 7:
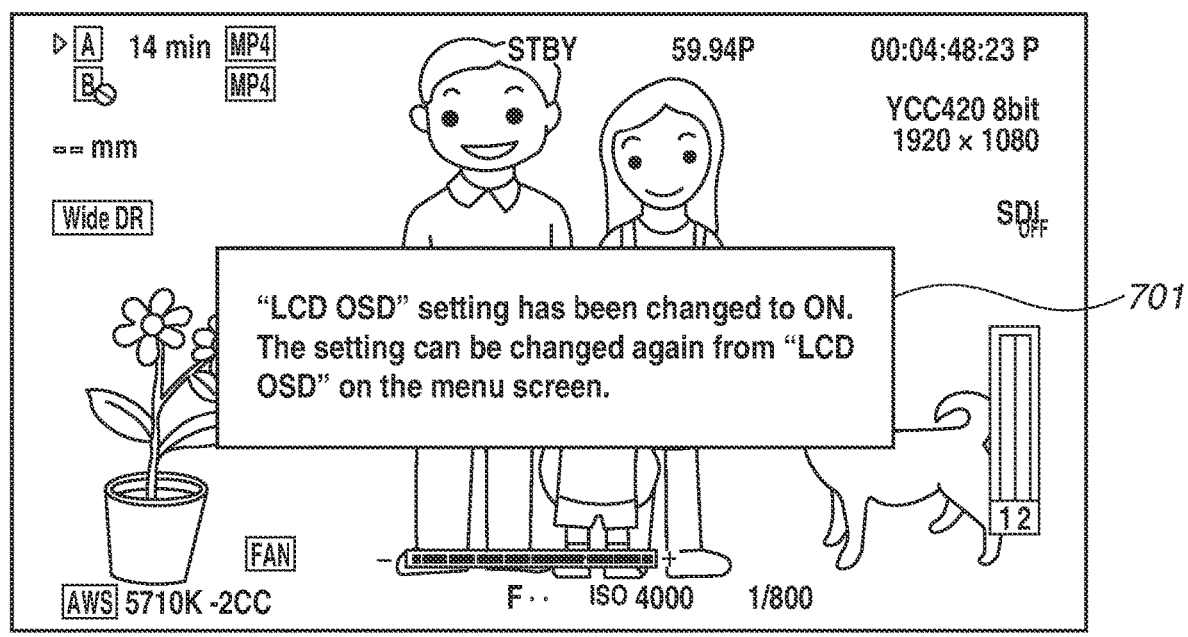
FIG. 7 is a diagram illustrating an example of a screen.

In S611, the system control unit 110 displays a guide screen of FIG. 7 or the "LCD OSD" setting screen of FIG. 5D. On the guide screen of FIG. 7, a guide 701 informs the user that the "LCD OSD" setting has been changed to on and of the operation for changing the setting to off again. If the "LCD OSD" setting screen of FIG. 5D is displayed, the menu processing of S403 and the subsequent operations is performed through a not-illustrated flow transition. In S611, the system control unit 110 can inform the user that the "LCD OSD" setting has been automatically changed. The system control unit 110 also displays information to be used to change the "LCD OSD" setting to off. This can guide the user so that an operation for changing the setting again can be smoothly made if the user finds the automatic change undesirable.

In S612, the system control unit 110 performs display control to output only the video image to the LCD panel 107. Here, the LCD panel 107 displays only the objects as illustrated in FIG. 5A. The processing then exits the flowchart.

In S613, the system control unit 110 performs display control to output the video image to the LCD panel 107 and superimpose the OSD on the video image. Here, the LCD panel 107 displays the display elements, such as character strings and icons, in a superimposed manner on the objects as illustrated in FIG. 5B. The processing then exits the flowchart.

As described above, if the LCD panel 107 is detected to have transitioned from the non-attached state to the attached state, the automatic change is executed to set the OSD on the LCD panel 107 on. This can make the OSD function on the LCD panel 107 convenient.

The foregoing various controls described to be performed by the system control unit 110 may be performed by a single piece of hardware. A plurality of pieces of hardware may control the entire digital video camera 100 by sharing of processing.

Other Exemplary Embodiments

Some embodiments can be implemented by processing for supplying a program for implementing one or more functions of the foregoing exemplary embodiments to a system or an apparatus via a network or a storage medium, and reading and executing the program by one or more processors in a computer of the system or apparatus. A circuit (such as an application specific integrated circuit (ASIC)) for implementing one or more of the functions may be used for implementation.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Applications No. 2019-141222, filed Jul. 31, 2019, and No. 2019-141275, filed Jul. 31, 2019, which are hereby incorporated by reference herein in their entirety.

What is claimed is:

1. A display control apparatus comprising at least one memory and at least one processor which function as:
a display control unit configured to control superimposed display of information on a captured image displayed on a display unit;
a setting unit configured to switch between setting on for providing the superimposed display and setting off for not providing the superimposed display; and
a control unit configured to,
even if an operation to change the setting from on to off is made by the setting unit while the superimposed display is provided, maintain the superimposed display provided, and control the superimposed display not to be provided according to the change of the setting in response to an instruction by a user to display the captured image without the superimposed display, and display a guide indicating that the superimposed display is not provided in response to the instruction to display the captured image without superimposing the information.

2. The display control apparatus according to claim 1, wherein the control unit is configured to control the superimposed display to be provided in response to an operation to change the setting from off to on by the setting unit.

3. The display control apparatus according to claim 1, further comprising a storage control unit configured to, if the operation to change the setting from on to off is made by the setting unit, store flag information for not providing the superimposed display in a storage medium,
wherein the control unit is configured to, if the flag information is stored in the storage medium, control the superimposed display not to be provided in response to the instruction to display the captured image without superimposing the information.

4. The display control apparatus according to claim 3, wherein the storage control unit is configured to, if an operation to change the setting to on is made by the setting unit with the flag information stored in the storage medium, delete the flag information.

5. The display control apparatus according to claim 1, wherein the control unit is configured to display a guide indicating an operation to set the superimposed display on.

6. The display control apparatus according to claim 1, wherein the control unit is configured to display a guide indicating being on standby before the superimposed display is controlled not to be provided.

7. The display control apparatus according to claim 1, wherein the instruction to display the captured image without superimposing the information is given by a predetermined operation.

8. The display control apparatus according to claim 1, wherein the instruction to display the captured image without superimposing the information is given by the operation to change the setting from on to off by the setting unit.

9. The display control apparatus according to claim 1, wherein the control unit is configured to, if the operation to change the setting from on to off is made by a predetermined operation, control the superimposed display not to be immediately provided.

10. An imaging apparatus configured to function as the display control apparatus according to claim 1, the imaging apparatus comprising
an imaging unit,
wherein the display control unit is configured to display an image captured by the imaging unit on the display unit and control the superimposed display to be provided on the captured image.

11. A non-transitory computer-readable storage medium storing a program for causing a computer to function as the units of the display control apparatus according to claim 1.

12. A method for controlling a display control apparatus including a display control unit configured to control superimposed display of information on a captured image displayed on a display unit, and a setting unit configured to switch between setting on for providing the superimposed display and setting off for not providing the superimposed display, the method comprising:
even if an operation to change the setting from on to off is made by the setting unit while the superimposed display is provided, maintaining the superimposed display provided, and controlling the superimposed display not to be provided according to the change of the setting in response to an instruction by a user to display the captured image without the superimposed display; and
display a guide indicating that the superimposed display is not provided in response to the instruction to display the captured image without superimposing the information.

13. A display control apparatus comprising at least one memory and at least one processor which function as:
a display control unit configured to control superimposed display of information on a video image to be displayed on a connectable display unit;
a setting unit configured to set the superimposed display of the information on the display unit on and off, wherein the setting unit is able to set the superimposed display either on or off regardless of whether the display unit is connected or not; and
a control unit configured to,
if power of the display control apparatus is on and further if setting of the superimposed display is off, perform control to change the setting of the superimposed display from off to on automatically in response to a transition in state of the display unit and the display control unit from a non-connection state to a connection state, and
if the power of the display control apparatus is on and further if the display unit and the display control unit are in the non-connection state, prohibit a change in the setting of the superimposed display from being made by a user operation.

14. The display control apparatus according to claim 13, wherein in the connection state, the display unit is attached to the display control apparatus.

15. The display control apparatus according to claim 13, wherein in the non-connection state, the display unit is not attached to the display control apparatus.

16. The display control apparatus according to claim 13, wherein whether the setting of the superimposed display is on or off is recorded on a recording medium configured to retain data even in a power-off state.

17. The display control apparatus according to claim 13, wherein the setting unit is configured not to, if the display unit is connected to the display control apparatus according to a predetermined transmission standard, control the superimposed display to be on.

18. The display control apparatus according to claim 17, wherein the predetermined transmission standard is a Serial Digital Interface (SDI) standard or a High-Definition Multimedia Interface (HDMI) standard.

19. The display control apparatus according to claim 13, further comprising a guide unit configured to, after the superimposed display is controlled to be on, display information used to change the setting of the superimposed display to off on the display unit.

20. An imaging apparatus configured to function as the display control apparatus according to claim 13, comprising:
an imaging unit,
wherein the display control unit is configured to display a video image captured by the imaging unit on the display unit and control the superimposed display of the information on the video image.

21. A non-transitory computer-readable storage medium storing a program for causing a computer to function as the units of the display control apparatus according to claim 13.

22. A method for controlling a display control apparatus including a display control unit configured to control superimposed display of information on a video image to be displayed on a display unit, and a setting unit configured to set the superimposed display of the information on the display unit on and off, the method comprising:
- if power of the display control apparatus is on and further if setting of the superimposed display is off, performing control to change the setting of the superimposed display from off to on automatically in response to a transition in state of the display unit and the display control unit from a non-connection state to a connection state, and
- if the power of the display control apparatus is on and further if the display unit and the display control unit are in the non-connection state, prohibiting a change in the setting of the superimposed display from being made by a user operation.

* * * * *